UNITED STATES PATENT OFFICE.

HENRI LEROUX, OF PARIS, FRANCE, ASSIGNOR TO LA SOCIÉTÉ D'ECLAIRAGE CHAUFFAGE ET FORCE MOTRICE, SIEGE SOCIAL, OF PARIS, FRANCE.

PROCESS FOR THE PRODUCTION OF HIGH-PERCENTAGE CARBAZOLE.

1,318,212.   Specification of Letters Patent.   Patented Oct. 7, 1919.

No Drawing.   Application filed October 31, 1918.   Serial No. 260,472.

*To all whom it may concern:*

Be it known that I, HENRI LEROUX, citizen of the Republic of France, and resident of Paris, France, (post-office address Rue Maria-Deraimes,) have invented a new and useful Process for the Production of High-Percentage Carbazole, which improvements are fully set forth in the following specification.

This invention relates to a process for the production of pure carbazole.

The solubility of anthracene and of carbazole in most solvents being, at ordinary temperature, approximately the same, the methods used in practice for concentrating anthracene lead to a product which also is richer in carbazole. All the same the use of pyridine gives a more complete purification of the anthracene; and in addition gives a pyridin liquor which is very rich in carbazole, containing apart from a small amount of anthracene, some of the impurities present in the crude product.

According to the invention, crude carbazole is dissolved in the warm in phenol (including phenol, crude phenol or crude carbolic acid and carbolic acid of 60% strength), cresols (including ortho-cresol, tri-cresol, *i. e.*, a mixture of meta-, ortho- and para-cresol and (including meta-para-cresol, *i. e.*, a mixture of meta- and para-cresols), xylenols and the like homologues of phenol), either used alone or in admixture with each other. The carbazole is then crystallized out, and the crystals separated from the mother liquor and washed by means of cresols or the like homologues of phenol or in mixtures of such phenols.

The pyridin liquors resulting from the purification of anthracene furnish after distilling off the pyridin a residue which when treated with phenolic products yields a product containing 80% carbazole.

Example 1.

1 kilo of pyradin residue resulting from the purification of anthracene is dissolved in the warm in 5 kilos of a mixture of cresols and xylenols. After cooling, the crystals are separated, and washed with a small amount of said mixture of cresols and xylenols these latter being then removed by any suitable known means. In this way an 80% carbazole is obtained.

The 80% carbazole when submitted to a new crystalization gives a 90% product.

Example 2.

1 kilo of 80% carbazole or the equivalent amount obtained from the previous treatment and still containing the phenolic compounds used for washing, is dissolved in 10 kilos of cresols and xylenols. The solution is filtered while hot (50° C) and the crystals are washed with a small amount of cresols and xylenols. After removing all the phenolic compounds, as before mentioned, a 90% carbazole is obtained.

The crude carbazole recovered from potassium carbazole which latter is obtained by the action of caustic potash on crude or concentrated anthracene leads also to a 90% carbazole after crystalization from phenolic compounds.

What I claim as new and desire to secure by Letters Patent of the United States is:—

1. The process for the production of carbazole which consists in dissolving crude carbazole in a phenolic compound, crystallizing out the carbazole and separating the crystals from the mother liquor.

2. The process for the production of carbazole which consists in dissolving in the warm crude carbazole in a phenolic compound, cooling the solution, crystallizing out the carbazole, separating the crystals from the mother liquor, washing the carbazole crystals with phenolic compounds and removing the washing liquids.

3. The process for the production of carbazole which consists in dissolving in the warm crude carbazole in a phenolic compound, crystallizing out the carbazole, separating the crystals from the mother liquor, washing the carbazole crystals with phenolic compounds, dissolving said crystals in a phenolic compound, filtering the solution while hot, crystallizing out the carbazole, separating the crystals from the mother liquor, washing the carbazole crystals with a small amount of phenolic compounds and removing the washing liquids.

4. The process for the production of carbazole which consists in dissolving in the warm the residue, obtained by distilling the pyridin liquor from the process of concentrating anthracene, in a phenolic compound, cooling the solution, crystallizing out the carbazole, separating the crystals from the mother liquor, washing the carbazole crystals with phenolic compounds and removing the washing liquids.

5. The process for the production of carbazole which consists in dissolving in the warm the residue, obtained by distilling the pyridin liquor from the process of concentrating anthracene, in a phenolic compound, crystallizing out the carbazole, separating the crystals from the mother liquor, washing the carbazole crystals with phenolic compounds, dissolving said crystals in a phenolic compound, filtering the solution while hot, crystallizing out the carbazole, separating the crystals from the mother liquor, washing the carbazole crystals with a small amount of phenolic compounds and removing the washing liquids.

In testimony whereof I have signed this specification in the presence of two subscribing witnesses.

HENRI LEROUX.

Witnesses:
  JULES TOUSSET,
  CHARLES LÉON LOISEL.